Patented June 22, 1926.

1,590,099

UNITED STATES PATENT OFFICE.

ANDREW KELLY, OF LONDON, ENGLAND, ASSIGNOR TO BORAX CONSOLIDATED LIMITED, OF LONDON, ENGLAND.

PROCESS OF TREATING BORON-CONTAINING MINERALS.

No Drawing. Application filed January 2, 1924, Serial No. 684,075, and in Great Britain January 16, 1923.

This invention is for the treatment of boron containing minerals and has for its object to produce alkali metal pentaborates therefrom.

It has heretofore been proposed to treat boron minerals with sodium sulphate and also with acid sodium sulphate, and these two compounds therefore are not contemplated per se by my invention.

According to the invention alkali metal pentaborates are formed by first treating in solution a quantity of boron-containing ore with a metallic sulphate capable of decomposing said ore, with the addition of alkali if necessary. The product of this decomposition is then converted into alkali-metal pentaborate by adding to said solution a further quantity of said boron-containing ore, and said alkali-metal pentaborate is then crystallized out.

The treatment is conducted in two stages as just set forth, initially at a relatively high temperature, and at the second stage at a lower temperature in order to obviate any tendency to a reverse re-action during the latter stage. The two stages of treatment have been found to produce a maximum yield of the alkali-metal pentaborate.

The metallic sulphates employed may be either those naturally occurring or artificial.

For example, boro-natro-calcite may be treated with a determined quantity of ferric sulphate or aluminum sulphate, or a mixture thereof.

It is important that pentaborate should be of a high degree of purity and particularly that it should be free from arsenic.

It has been found that special treatment for the removal of the arsenic can be rendered unnecessary by employing either natural ferric sulphate or artificial ferric sulphate, for the arsenic is then retained in the residual mud and completely eliminated from the final product.

The composition of the boro-natro-calcite is first determined and in accordance with the amount of calcium combined with the boron so is the quantity of the metallic sulphate necessary for the decomposition arrived at.

The following experiment may be taken as illustrating the invention.

90 lbs. of native boronatrocalcite containing 19% of $B_2O_3$ and 800 parts per million of arsenic was treated in the following manner with 40 lbs. of a concentrated solution of ferric sulphate containing 22.5% of $SO_3$.

50 lbs. of the native borate mineral was first heated to about 80° C. and to this was added the 40 lbs. of sulphate solution (also heated to 80° C.) The mixture was then further heated to a temperature of 95° C. and maintained at this for three quarters of an hour. At the end of this time the remaining 40 lbs. of native borate mineral was added. This reduced the temperature of the charge to between 70° and 75° C., at which temperature it was maintained for a further period of three quarters of an hour.

At the end of this time the boronatrocalcite was completely decomposed, and the mixture now mainly consisted of a concentrated solution of sodium pentaborate together with the insoluble calcium sulphate and ferric hydroxide. These latter were removed by filtration by known methods, and the filtrate allowed to cool, sodium pentaborate then crystallized out.

The yield of sodium pentaborate obtained thus contained 91% of the $B_2O_3$ present in the mineral used and was found to be practically free from arsenic—the actual amount of $As_2O_3$ present being two parts per million.

As another example, colemanite may be treated with a determined quantity of an alum, either natural or artificial. Manifestly either a potash alum or a soda alum may be employed.

What I claim is:—

1. The production of an alkali-metal pentaborate by first treating in solution a quantity of boron-containing mineral with a soluble non-alkali-forming metal sulphate, then converting said treated mineral into alkali-metal pentaborate by adding to said solution a further quantity of said boron-containing mineral, and thereafter crystallizing out said alkali-metal pentaborate.

2. The production of an alkali-metal pentaborate by first treating in solution a quantity of boron-containing mineral with a soluble non-alkali-forming metal sulphate, with the addition of alkali, then converting said treated mineral into alkali-metal pentaborate by adding to said solution a further quantity of said boron-containing mineral, and thereafter crystallizing out said alkali metal pentaborate.

3. The production of alkali metal pentaborate by treating a boron-containing mineral with ferric sulphate in solution.

4. The production of alkali metal pentaborate by treating a boron-containing mineral, with the addition of alkali, and ferric sulphate in solution.

In testimony whereof I affix my signature.

ANDREW KELLY.